Figure 1:
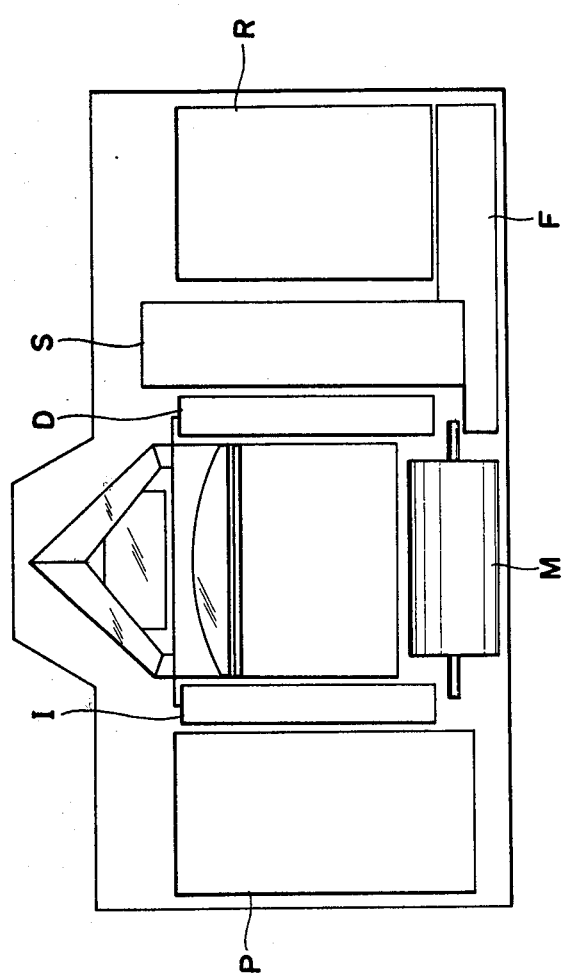

United States Patent [19]

Yamada et al.

[11] 4,204,759
[45] May 27, 1980

[54] CAMERA WITH BUILT-IN MOTOR

[75] Inventors: Minoru Yamada, Hachioji; Yasutsugu Nakagawa, Hamura, both of Japan

[73] Assignee: Konishiroku Photo Industry Co., Ltd., Tokyo, Japan

[21] Appl. No.: 962,913

[22] Filed: Nov. 22, 1978

[30] Foreign Application Priority Data

| Nov. 25, 1977 | [JP] | Japan | 52-142053 |
| Nov. 28, 1977 | [JP] | Japan | 52-142519 |
| Dec. 22, 1977 | [JP] | Japan | 52-155147 |

[51] Int. Cl.² .................. G03B 1/18; G03B 99/12
[52] U.S. Cl. ............................. 354/152; 354/173
[58] Field of Search .......... 354/152, 153, 170, 173, 354/154-158

[56] References Cited

U.S. PATENT DOCUMENTS

| 3,098,418 | 7/1963 | Reiher et al. | 354/173 |
| 3,895,389 | 7/1975 | Arai | 354/173 |
| 3,906,527 | 9/1975 | Erlichman | 354/152 |
| 3,967,298 | 6/1976 | Adamski | 354/152 X |

FOREIGN PATENT DOCUMENTS

330514  6/1958  Switzerland .................... 354/173

Primary Examiner—L. T. Hix
Assistant Examiner—Thomas H. Tarcza
Attorney, Agent, or Firm—James E. Nilles

[57] ABSTRACT

A camera with built-in motor having a motor disposed horizontally at the central bottom portion of the camera body and out of path of the input light for driving various drive mechanisms necessary for the photographing. Said motor has two output shafts extending out of the housing of the motor, so that two or more loads may be simultaneously driven by the motor. Said mechanisms are suitably sorted into groups by the magnitudes of the loads imparted by these mechanisms, and these groups are driven by the motor in such a sequence as to maintain a substantially constant level of load on the motor in relation to time.

4 Claims, 2 Drawing Figures

CAMERA WITH BUILT-IN MOTOR

The present invention relates to a camera having at least one built-in motor for winding of the film and charging of the shutter mechanism and so on.

It has been known to use a motor as a power source for various photographing operations with a camera such as film winding, rewinding, charge and release of the shutter, automatic focusing and, in case of a single lens reflex camera, charging of the power for vertically driving the mirror. This type of camera is generally referred to as a motor-driven type camera, including the motor-driven winder device, and has been used popularly.

However, in the existing camera of the kind described, the motor drive device is designed and produced as a separate device, because manually operable conventional mechanisms are used in the camera body. Thus, the motor drive device functions merely as a driving source, and is adapted to be attached to the bottom of the camera body.

Therefore, a troublesome work is required for attaching the motor drive device to the camera body, when the camera is used with the motor drive device. In addition, the total weight and volume of the camera and the motor drive device are necessarily large, as compared with the weight and volume of the motor drive device itself, which, not only deteriorates the handiness, but causes various inconveniences such as poor operability of the camera and lack of stability in the photographing.

Also, in the mechanical aspect, this detachable type motor drive device requires an extremely severe restriction and control of the position, because of the necessity of the mechanical and electric connection between the motor drive device and the camera body. In addition, the mechanical connection can be made only at the lower portion of the winding shaft of the conventional camera.

For these reasons, the combination of the motor drive device and the conventional camera inevitably involves a double or duplicate provision of the driving power transmission systems of the motor drive device and the camera, and other unnecessary arrangements. These unnecessary arrangements inevitably increases the driving power to be exerted by the motor drive device, which in turn demands an uneconomically large power of the motor. This also leads to a demand for a larger capacity of the electric power source for driving the motor and such disadvantages are undesirable, especially, when it is used with single lens reflex camera which having various merits e.g. the mobility or operability.

All of these disadvantages are attributable mainly to the fact that the camera body and the motor drive device are designed and manufactures as separate devices.

The invention therefore aims at providing a camera with a built-in motor, thereby to eliminate the above described disadvantages of the prior art.

Good mobility and operability are the essential requisites for cameras, particularly for a single lens reflex camera. In order to preserve the good mobility and the operability, the whole size of the camera having a built-in motor cannot be so large, although the size can considerably be reduced as compared with the whole size of the combination of separate motor drive device and the camera. In addition, the incorporation of the motor in the camera body may impractically limit the space for the installation of other parts of the camera. From this point of view, it is very important, in designing a camera having a built-in motor, to determine at what part of the camera the motor is to be installed.

As disclosed in, for example, Japanese Patent Publication No. 5450/1974, charging mechanisms are concentrated to both sides of the mirror box and to the lower side of the winding shaft, and a vacant space is left under the mirror box, in the conventional single lens reflex camera. Under this circumstance, the present inventors have found that the motor can fairly be accomodated by the space under the mirror box, and can suitably be connected to the charging mechanisms, when the motor is situated horizontally in that space. Namely, the power of the motor can efficiently be derived and transmitted to the charging mechanisms, by connecting these mechanisms to the output shaft of the motor which extends in both directions out of the motor housing.

Also, in case of a compact camera, the various mechanisms are disposed concentrically around the base portion of the lens barrel, and there is space at the central lower portion of the camera which space is enough to accomodate the motor. Therefore, the motor can be mounted in the space so as to connect with suitable mechanisms. Thus, also in the compact camera, it is possible to incorporate the motor in the camera body without substantially modifying the construction of the conventional camera.

It is therefore a major object of the invention to provide a camera having a built-in motor, in which the motor is installed horizontally in the space of the central lower portion of the camera body, which space being ample enough and affords a reasonable mechanical connection of the motor to the mechanisms of the camera for driving these mechanisms with the minimized power.

In order not to substantially increase the weight and size of the camera with built-in motor as compared with the conventional camera, it is necessary to improve the motor itself, for a smaller size and reduced power consumption. However, at the present level of the manufacture of the motor, there is a practical limit in such an improvement of the motor. Namely, the small motors which are now commercially available can provide only a small power. It therefore becomes necessary to efficiently drive the mechanisms of the camera by a small-sized motor.

If all of the mechanisms are driven at once by the motor, the load imposed on the motor will become excessively large. Under this circumstance, the present inventors have found out a driving method, in which the mechanisms to be driven by the motor are sorted into the mechanisms which pose large loads and mechanisms which pose only small loads, and the mechanisms which pose large loads are driven separately or solely, while the mechanisms of small loads are driven simultaneously if met by the capacity of the motor. The drives of the mechanisms of large and small loads are thus made in a suitable sequence or timed relationship.

More specifically, in case of a single lens reflex camera, there are some mechanisms of small loads such as mirror charge or, in aperture or a diaphragm charge, as well as mechanisms of relatively large loads, e.g. film winding and shutter charge. In this case, the drives may be made in such a sequence that at first the mirror charge and the diaphragm charge are made concurrently, then the film winding is made and finally the shutter is charged.

As a matter of fact, various cameras have different mechanisms of different magnitudes of loads. Therefore, it is not possible to definitely sort these mechanisms into mechanisms which require the separate or sole drive or to the mechanisms which may be driven simultaneously with the drive of other mechanism or mechanisms. On the other hand, the capacity of the motor has to be also taken into consideration. Thus, in some cases, all of the mechanisms may be driven separately and sequentially, while in some other cases, all of the mechanisms may be driven in suitable combinations in a sequential manner. At the same time, the sequence of the drive itself may be changed in accordance with the positional relationship between the mechanisms and the motor and other conditions.

It is therefore another object of the invention to provide a camera having a built-in motor, in which the drives of various mechanisms required for the photographing are sorted depending the magnitude of the load, and are made in a suitable sequential manner, such that the level of the load applied to the motor is levelled in relation to time, so that these mechanisms may be driven by a small-sized motor.

Incidentally, there are mainly two types of quick mirror-return mechanisms: a jump up type in which the movable mirror, which is normally spring-loaded downwardly, is made to jump up at the time of the photographing, and then reset by the spring, and a reversing type in which the mirror, which is normally spring loaded upwardly, is released to jump up at the time of the photographing and then reset by a spring which is charged during the jumping up of the mirror. In the conventional cameras in which the mirror charge is made by a manual force or the power of a large-sized motor incorporated in the separate motor drive device, the level of the power required for the mirror charge is not of concern. This power, however, poses a substantial problem in the camera in which the power for driving the mechanisms is derived from a small-sized motor. In case of the jumping type, it is necessary to charge a hitting member which causes rapidly the upward jumping of the downwardly spring-loaded mirror. Also, in case of the reversing type, it is necessary to charge the spring to quickly lift up the mirror and to charge another spring in the opposite direction against the jumping. Thus, in either case, a considerably large force is required for charging the quick mirror-return mechanism.

It is therefore still another object of the invention to provide a camera with a built-in motor, provided with a mirror drive system which can be charged by a relatively small force. To this end, in the camera of the invention, the movable mirror is normally biased only in the direction toward the path of light of photographing, and the motor is started to reset the mirror to the starting position in response to a photographing preparation signal delivered during the period from the time of completion of the photographing to the commencement of the next photographing, e.g. a signal derived from the running of the rear screen or winding of the film. Therefore, the motor has only to charge the resilient member which is energized in the jumping direction of the mirror. This conveniently enables a motor having smaller power to actuate the mirror drive system. In addition, the mirror drive system itself is simplified considerably. Further, since the mirror drive mechanism is disposed at both sides of the mirror box, the power can easily be transmitted to the mechanism from a motor disposed under the mirror, and the power transmitting system for the mirror drive mechanism can be disposed on a plane. This in turn ensures a higher efficiency of the power transmitting, as well as a compact construction of the camera.

Since the reflecting mirror is driven by the motor, it is necessary to abruptly stop the rotor of the motor after the completion of the charge, so as to provide a stable image in the view finder.

Conventional method to adruptly stop the motor is to apply a reverse current to the motor, or to bring a stopper such as a hook into engagement with the cam or gear associated with the motor. However, the first-mentioned method is liable to incur a soon damaging of the electric part, while the second-mentioned method is likely to cause a jamming of worm and worm wheel of a worm type reduction gear which is preferred in a camera in which a large reduction ratio has to be obtained by a small number of gear trains because of the limited installation space.

The invention therefor proposes to add a function to stop the motor, to the mirror driving system having the described construction. More specifically, according to one aspect of the invention, a motor power transmitting system is constituted by a control member fixed to the rotor shaft of the motor and provided with a stopper member for controlling the rotation of the rotor shaft, an operation limiting cam member adapted to be rotated in accordance with the rotor shaft of the motor, and a rotation limiting member which includes a first arm portion adapted to be displaced in response to the rotation of the movable mirror, a second arm portion adapted to slide along the cam contour of a cam member on the operation limiting member in response to the displacement of said first arm portion, and a third arm portion which is adapted to be brought into and out of engagement with the controlling member also in response to the displacement of the first arm portion. Simultaneously with or a predetermined time after the resetting of the mirror by the motor, the power supply to the motor is cut off. Concurrently with the cutting off of the power supply, the second arm portion of the rotation limiting member comes to ride on the cam surface of the operation limiting cam so that the rotation limiting member is rotated to bring the third arm portion into engagement with the stopping portion of the control member, thereby to stop the motor. This system can stop the motor without imparting any excessive inertia to the worm reduction gear, so that the aforementioned problem of the prior art can fairly be avoided. At the same time the compact nature of the drive power transmission system disposed at the side of the mirror box is never deteriorated.

These and other objects, as well as advantageous features of the invention will become more clear from the following description of the preferred embodiment taken in conjunction with the accompanying drawings.

Figure 2:
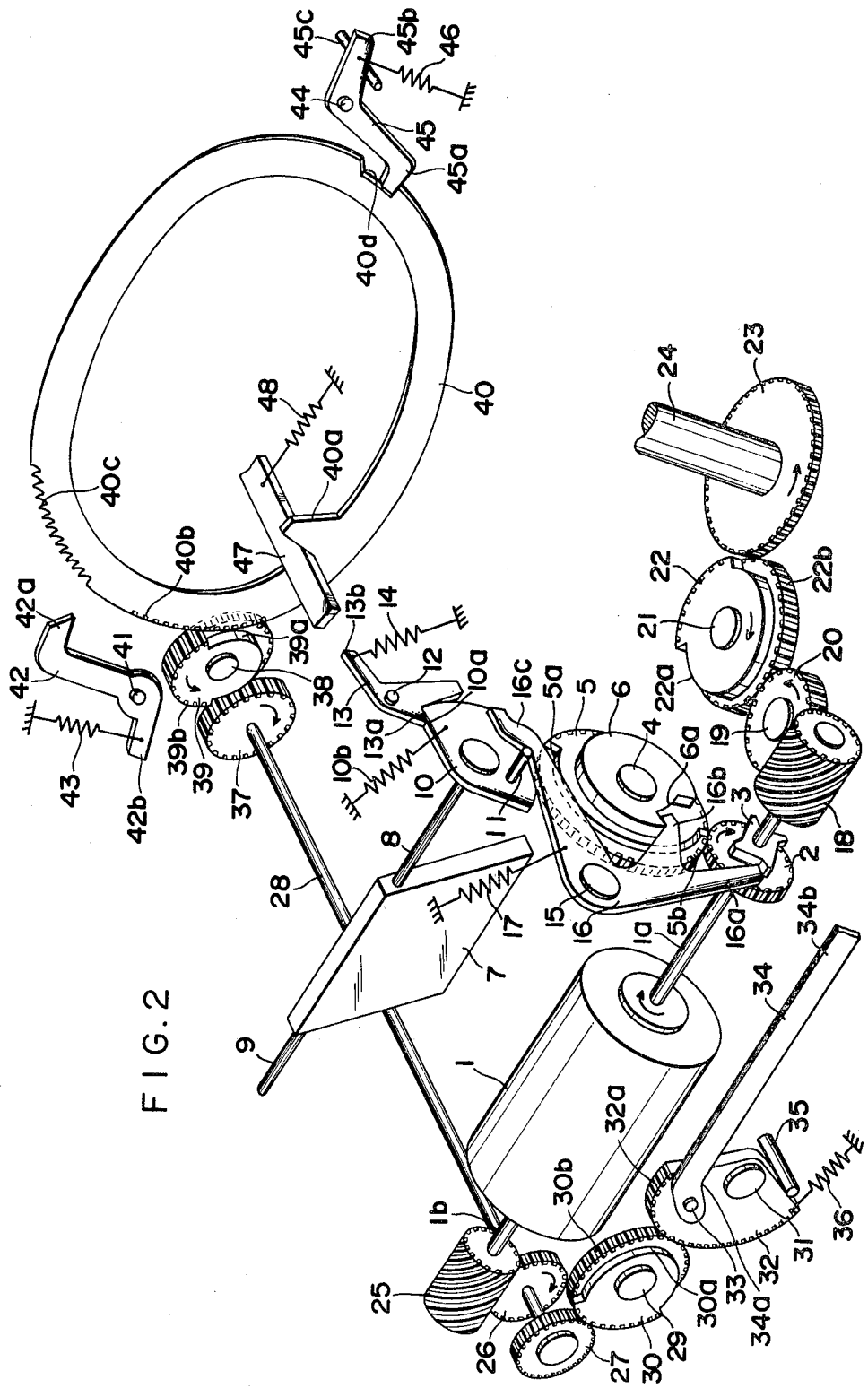

FIG. 1 is a back elevational view of a camera embodying the present invention, showing the arrangement of various drive mechanisms incorporated in the camera, and FIG. 2 is a perspective view of a camera embodying the invention, in the state in which all mechanisms have been charged.

FIG. 1 shows the arrangement of various drive mechanisms in a camera of the invention as viewed from the back side. For facilitating the understanding of the invention, these mechanisms in FIG. 1 are installed in the same manner as the general arrangement in conventional cameras. It will be understood, also from this FIG. 1, that the mechanisms are located concentrically at both sides of the mirror box, and that the most suitable location of a motor, when the camera has to have a built-in motor, is the space under the mirror box, where the motor can be connected to the mechanisms in the most simple and reasonable way.

In FIG. 1, symbols P,M,R and S represent, respectively, a cartridge chamber, a motor, a reel chamber and a shutter drive mechanism, while a mirror driving mechanism and a film winding mechanism are designated at symbols D and F. Symbol I represents a diaphragm drive mechanism.

FIG. 2 shows a perspective view of an embodiment of the invention, in the state ready for the photographing. Concentric output shafts 1a, 1b project laterally from both sides of a motor 1 disposed under a mirror box (not shown). These shafts are rotated in the direction of the arrow, when the motor is operated. A small gear 2 to which a ratchet wheel 3 is fixed, and a worm 18 for film winding are fixed to the output shaft 1a, while an iris diaphragm or an aperture drive worm 25 is fixed to the other output shaft 1b.

A mirror charge gear 5 is rotatably carried by a shaft 4 at one side of the mirror box (not shown). An operation limiting cam 6 provided with a recess 6a is fixed to the mirror charge gear 5. The gear 5 has a toothed portion 5b and a non-toothed portion 5a. The toothed portion 5b meshes with the small gear 2, while the non-toothed portion 5a engages a later-mentioned mirror-driving sector gear 10 so as to limit the rotation of the sector gear 10.

To the mirror-driving sector gear 10, attached are one of the shaft 8, 9 for supporting a mirror 7, and a pin 11. With one end 10a of the toothed end of the sector gear 10, engages a projection 13a of a hook 13 which is biased by a spring 14 for a clockwise rotation around the axis of a shaft 12, so as to prevent the mirror-drive sector gear 10 from being rotated counter-clockwise by a spring 10b after the completion of the charge of the sector gear 10.

A rotation limiting lever 16 has a first, a second and a third levers 16a, 16b and 16c, and is rotatably carried by a shaft 15. Since this lever 16 is biased counter-clockwise by a spring 17, the second lever 16b is made to slide along the periphery of the operation limiting cam 6. As the second lever 16b is dropped into the recess 6a of the operation limiting cam 6 the rotation limiting lever 16 is rotated counter-clockwise, so that the first lever 16a is brought into engagement with the ratchet wheel 3 fixed to the small gear 2, thereby to prevent the further rotation of the output shafts 1a, 1b of the motor 1.

However, as the mirror-driving sector gear 10 commences the counter-clockwise rotation, the third lever 16c is pressed by the pin 11 and rotated clockwise, so that the second lever 16b and the first lever 16a are released from the recess 6a of the operation limiting cam 6 and the ratchet wheel 3, respectively.

A winding worm wheel 20 is mounted rotateably on a shaft 19, and meshes with a winding worm 18. At the same time, a wind limiting gear 22 is rotatably carried by a shaft 21, and is unitarily provided with a toothed portion 22b and non-toothed portion 22a. The toothed portion 22b engages the aforementioned worm wheel 20, while the non-toothed portion 22a engages a winding gear 23 so as to limit the rotation of the latter.

A winding shaft 24 is attached to the winding gear 23, so as to wind a film by a predetermined length, through a reel which is not shown.

An aperture-drive worm wheel 26 is carried by a rotary shaft 28 at a mid portion of the latter. The rotary shaft 28 carries at its one end a small gear 27 for shutter charging, and at its other end a small gear 37 for driving aperture controller.

The shutter charge gear 30 is carried rotatably by a shaft 29, and is provided with a toothed portion 30b and a non-toothed portion 30a. The toothed portion 30b engages the shutter charging small gear 27, while the non-toothed portion 30a is in engagement with a shutter-charging sector gear 32, so as to limit the rotation of the latter.

A connecting lever 34 for charging the shutter (not shown) has a bent portion 34a which is disposed through a charge pin 33 in the vicinity of one end of the toothed end of the shutter-charging sector gear 32, such that the connecting lever 34 is swingable at its one end.

At the same time, the shutter-charging sector gear 32 is carried rotatably by a shaft 31, and is biased counter-clockwise by a spring 36, so as to make a reciprocating movement starting from a position where it engages a stopper 35.

The connecting lever 34 is connected at its other end 34b to a charge lever (not shown) for charging the shutter.

An aperture or a diaphragm ring 40 has an annular form and is provided at its periphery with a ratchet portion 40c for limiting the position, a toothed portion 40b for driving and a recess 40d for limiting the initial position. At the same time a projection 40a for engagement with a lens-barrel connecting lever 47, which in turn engages an iris (not shown) of the lens, is provided on the inner periphery of the aperture ring 40.

The aperture ring 40 is adapted to be rotated by the contact of the projection 40a with the lens-barrel connecting lever 47, which is biased for a smaller diameter of the aperture opening by a spring 48.

An aperture-ring drive gear 39 is rotatably carried by a shaft 38, and is provided with a toothed portion 39b and a non-toothed portion 39a, unitarily therewith. The toothed portion 39b engages with the small gear 37 for driving the aperture control, while the non-toothed portion 39a is in engagement with the driving toothed portion 40b of the aforementioned aperture ring 40.

An aperture ring position limiting lever 45 is carried by a shaft 44, and is biased by a spring 46 in the clockwise direction, but a stopped the rotation by a pin 45c and slidingly contacts at its end 45a the outer peripheral surface of the aperture ring 40, so as to engage the recess 40d of the ring 40, thereby to set the initial position of the aperture ring 40. An aperture ring stopper 42 is rotatably carried by a shaft 41 and is biased in the clockwise direction by a spring 43 connected to an end 42b thereof. This stopper 42 is adapted to be released in response to an aperture signal delivered by an exposure control circuit (not shown), and is rotated in the clockwise direction so that the other end 42a thereof meshes with the ratchet portion 40c of the aperture ring 40 to prevent the rotation of the latter, thereby to determine the aperture value.

Hereinafter, an explanation will be made as to the charging operations of these mechanisms. After a completion of one photographing and before the next photographing, a motor-drive signal is delivered to the motor 1 by a control circuit (not shown), so that the motor 1 is energized to drive the output shafts 1a, 1b in the direction of the arrow. Consequently, the small gear 2, film winding worm 18 and the aperture driving worm 25 are rotated. The rotation of the small gear 2 in turn causes a rotation of the mirror charge gear 5. Also, the mirror-driving sector gear 10 is rotated clockwise, energizing the spring 10b. As the energization of the spring 10b is completed, the projection 13a of the hook 13 comes to retain one end 10a of the mirror-driving sector gear 10, so that the clockwise rotation of the mirror-driving sector gear 10, which has entered the non-toothed portion 5a of the mirror charge gear 5, is stopped to complete the mirror charge.

Simultaneously with the starting of this mirror charge, the aperture ring 40 is also rotated clockwise through the driving worm wheel 26, aperture driving small gear 37 and the aperture ring driving gear 39, so that the lens-barrel connecting lever 47 is moved by the projection 40a of the aperture ring 40, overcoming the force of the spring 48. Simultaneously with or in advance to the completion of the mirror charge, the rotation of the aperture ring 40 is stopped by the non-toothed portion 39a of the aperture driving gear 39, and the iris of the lens is held at the opened state by the end 45a of the aperture ring position limiting lever 45 which has engaged the recess 40d of the aperture ring just before the stopping of the aperture ring 40, thus completing the aperture charge.

After the completion of the mirror charge and the aperture charge which pose relatively small loads and require relatively small angular displacements, the winding gear 23, which has not been rotated by the presence of the non-toothed portion 22a of the winding limiting gear 22, commences to rotate as the non-toothed portion 22a terminates, so that a predetermined length of film is wound by the rotation of the winding shaft 24 and the reel (not shown).

After the completion of the winding of the film, the shutter charging gear 30, which has been rotated counter-clockwise through the shutter charging gear 27, comes to engage the shutter-charging sector gear 32, so as to displace the connecting lever 34 to the right, thereby to commence the shutter charge. As the shutter charge gear 30 has been rotated by a predetermined amount, it is disengaged from the shutter-charging sector gear 32 because the non-toothed portion 30a is brought to the position of engagement. Consequently, the shutter-charging sector gear 32 is rotated counter-clockwise by the spring 36, into contact with the stopper 35, thereby to complete the shutter charge.

Simultaneously with the completion of the shutter charge, the electric power supply to the motor 1 from the motor drive circuit is cut off, so that the second lever 16b of the rotation limiting lever 16 comes to engage the recess 6a of the operation limiting cam 6, so as to be rotated counter-clockwise. As a result, the first lever 16a engages the ratchet 3 fixed to the small gear 2, so as to prevent further rotation of the motor output shafts 1a, 1b, so that the operations of all mechanisms are stopped and the mechanisms are set at the state as shown in FIG. 2.

Hereinafter, a description will be made as to how the photograph is taken by the camera of the invention having the described construction.

As a release button (not shown) on the camera body is depressed, the arm 45b of the aperture ring position limiting lever 45 is struck by a release member (not shown), so that the aperture ring position limiting lever 45 is rotated counter-clockwise. Consequently, the end 45a is released from the recess 40d of the aperture ring 40, so as to allow the latter 40 to be rotated counter-clockwise by the lens-barrel connecting lever 47, whereby the aperture adjustment is commenced. As the aperture has been closed to the optimum opening, the exposure control circuit derivers a signal, so that the aperture ring stopper 42 is rotated clockwise into engagement with the ratchet portion 40c of the aperture ring 40, thereby to prevent the latter from rotating further.

Subsequently, an end 13b of the hook 13 is nit by the aforementioned release member, so as to rotate the hook 13 counter-clockwise, thereby to release the end 10a of the mirror-driving sector gear 10 from the hook 13. As a result, the mirror-driving sector gear 10 is allowed to rotate counter-clockwise by the force of the spring 10b, so that the mirror 7 is swung upward, out of the path of light. In the course of this movement of the mirror 7, the third lever 16c of the rotation limiting lever 16 engages the pin 11 fixed to the mirror-driving sector gear 10, so as to rotate the rotation limiting lever 16 clockwise, thereby the release the second lever 16b and the first lever 16a from the recess 6a of the operation limiting cam 6 and from the ratchet wheel 3, respectively. The shutter starts to work simultaneously with the completion of the lifting of the mirror 7, thereby to complete the photographing. Immediately after the completion of the photographing, the control circuit acts to actuate the motor driving circuit, as to start the motor 1, and the mirror 7 is reset to the starting position by the charging operation described before.

As has been described, according to the invention, there is provided a compact camera with a built-in motor, capable of automatically charging mechanisms in the camera.

In the foregoing embodiment, the motor has been stated to be installed beneath the mirror box. This location of the motor, however, is not exclusive, and the position of the motor is optimumly determined in accordance with the arrangement of the drive mechanisms in the camera.

At the same time, in the foregoing embodiment, the electric power supply to the motor is not cut off immediately after the completion of the mirror charge, because the film winding and the shutter charge are made after the completion of the mirror charge. However, in case of a camera in which the motor drives only the mirror charge or in which other mechanisms are charged simultaneously with the mirror charge, the electric power supply to the motor is cut off at the time of completion of the mirror charge. At the same time, the cutting off of the electric power supply may be effected by any member of the power transmitting system for the mirror charge.

Further, needless to say, the operation limiting cam may be arranged to displace the rotation limiting member by its projection, rather than by the recess, so as to bring the third arm into engagement with the ratchet wheel from the direction opposite to that in the described embodiment. At the same time, the timing at which the drive of the mirror is commenced may be selected to be at any moment before the next photographing, e.g. at the time of the film winding or shutter charge, although most preferably the timing is immediately after the completion of running of the rear screen.

As has been described, the invention provides a compact and less expensive camera with built-in motor, because the mirror charge can be effected by a small motor of small power consumption and because the power transmitting system is considerably simplified.

Finally, although only one motor is located at the central bottom portion of the camera in the described embodiment, it is possible to install at least one additonal motor at other portion or portions of the camera than mentioned above.

What is claimed is:

1. A single lens reflex camera including a camera housing, a movable mirror, a mirror charging mechanism, a diaphragm, a diaphragm charging mechanism, a film winding mechanism, a shutter, and a shutter charging mechanism, characterized by comprising at least one small motor disposed horizontally in parallel to a film surface under the movable mirror and at the bottom portion of the housing adjacent to the film surface, an output shaft of the motor projected from both sides of the motor, the mirror charging mechanism being arranged at one side of the movable mirror and connected substantially to the output shaft at one side of the motor, the diaphragm charging mechanism being arranged at the other side of the movable mirror and connected substantially to the output shaft at the other side of the motor, first intermittent motion control means arranged between the output shaft at said one side of the motor and the mirror charging mechanism, second intermittent motion control means arranged between the output shaft at said other side of the motor and the diaphragm charging mechanism, the film winding mechanism being connected to the output shaft at either side of the motor through a respective intermittent motion control means, said first and second intermittent motion control means being constructed and operated such that power is transmitted from the motor to the mechanism by said first and second motion control means in different timed sequences.

2. A single lens reflex camera including a camera housing, a movable mirror, a mirror charging mechanism, a diaphragm, a diaphragm charging mechanism, a film winding mechanism, a shutter, and a shutter charging mechanism, characterized by comprising at least one small motor disposed horizontally in parallel to a film surface under the movable mirror and at the bottom portion of the housing adjacent to the film surface, an output shaft of the motor projected from both sides of the motor, a mirror charging mechanism being arranged at one side of the movable mirror and connected substantially to the output shaft at one side of the motor, the diaphragm charging mechanism being arranged at the other side of the movable mirror and connected substantially to the output shaft at the other side of the motor, first intermittent motion control means arranged between the output shaft at said one side of the motor and the mirror charging mechanism, second intermittent motion control means arranged between the output shaft at said other side of the motor and the diaphragm charging mechanism, the shutter charging mechanism being connected to the output shaft at either side of the motor through a respective intermittent motion control means, said first and second intermittent motion control means being constructed and operated such that power is transmitted from the motor to the mechanisms by said first and second intermittent motion control means in different timed sequences.

3. A single lens reflex camera including a camera housing, a movable mirror, a mirror charging mechanism, a diaphragm, a diaphragm charging mechanism, a film winding mechanism, a shutter, and a shutter charging mechanism, characterized by comprising a small motor disposed horizontally in parallel to a film surface under the movable mirror and at the bottom portion of the housing adjacent to the film surface, an output shaft of the motor projected from both sides of the motor, the mirror charging mechanism being arranged at one side of the movable mirror and connected substantially to the output shaft at one side of the motor, the diaphragm charging mechanism being arranged at the other side of the movable mirror and connected substantially to the output shaft at the other side of the motor, first intermittent motion control means arranged between the output shaft at said one side of the motor and the mirror charging mechanism, second intermittent motion control means arranged between the output shaft at said other side of the motor and the diaphragm charging mechanism, the film winding mechanism being connected to the output shaft at either side of the motor through a respective intermittent motion control means, the shutter charging mechanism being connected to the output shaft at either side of the motor through a respective intermittent motion control means arranged between the output shaft of the motor and the shutter charging mechanism, said first and second intermittent motion control means being constructed and operated relative to one another in such a way that each intermittent motion controls means transmits power to the mechanism in different timed sequences from one another, each of said first and second intermittent motion control means including a gear with a non-toothed portion.

4. A single lens reflex camera with built-in motor in which the preparatory operations for the photographing are made by the power of a motor incorporated in the camera comprising: means for normally biasing a movable mirror in the finder optic system out of path of the light, means for starting the motor by a photographing preparation signal issued in the period between the completion of one photographing and the next photographing, means for allowing the movable mirror from the position out of the path to a position in the path, making use of the power of the motor, a motor disposed beneath the movable mirror, a control member fixed to the rotor shaft of the motor and provided with a stopper portion for controlling the rotation of the rotor shaft, an operation limiting cam member adapted to be rotated in accordance with the rotation of the rotor shaft, and a rotation limiting member including a first arm portion movable in response to the rotation of the movable mirror, a second arm member slideable along the cam contour of the operation limiting cam member in accordance with the movement of the first arm portion and a third arm portion adapted to be brought into and out of engagement with the stopper member in response to the movement of the first arm portion.

* * * * *